US008538345B2

(12) United States Patent
Mohammadian

(10) Patent No.: US 8,538,345 B2
(45) Date of Patent: Sep. 17, 2013

(54) APPARATUS INCLUDING HOUSING INCORPORATING A RADIATING ELEMENT OF AN ANTENNA

(75) Inventor: Alireza Hormoz Mohammadian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1057 days.

(21) Appl. No.: 12/063,402

(22) PCT Filed: Oct. 9, 2007

(86) PCT No.: PCT/US2007/080829

§ 371 (c)(1), (2), (4) Date: Feb. 8, 2008

(87) PCT Pub. No.: WO2009/048461

PCT Pub. Date: Apr. 16, 2009

(65) Prior Publication Data

US 2010/0134350 A1 Jun. 3, 2010

(51) Int. Cl.
*H04B 1/38* (2006.01)

(52) U.S. Cl.
USPC ...... 455/73; 455/90.3; 455/575.1; 455/575.5; 455/575.7; 455/41.3; 455/66.1; 343/702; 343/786; 343/844; 342/357.06; 368/10

(58) Field of Classification Search
USPC ........... 455/73, 90.3, 83, 575.5, 575.1, 575.2, 455/66.1, 556.1, 575.7, 41.3, 569.1; 343/786, 343/795, 702, 745; 368/10
See application file for complete search history.

(56) References Cited

U.S. PATENT DOCUMENTS

| | | | | |
|---|---|---|---|---|
| 5,687,169 | A | 11/1997 | Fullerton | |
| 5,699,319 | A * | 12/1997 | Skrivervik | 368/10 |
| 5,721,783 | A * | 2/1998 | Anderson | 381/328 |
| 5,764,696 | A | 6/1998 | Barnes et al. | |
| 5,812,081 | A | 9/1998 | Fullerton | |
| 5,832,035 | A | 11/1998 | Fullerton | |
| 5,907,427 | A | 5/1999 | Scalora et al. | |

(Continued)

FOREIGN PATENT DOCUMENTS

| | | |
|---|---|---|
| CN | 1120250 A | 4/1996 |
| FR | 2390049 | 12/1978 |

(Continued)

OTHER PUBLICATIONS

Partial International Search Report—PCT/US07/080829, International Search Authority—European Patent Office, Jul. 10, 2008.

(Continued)

*Primary Examiner* — Marceau Milord
(74) *Attorney, Agent, or Firm* — Paul S. Holdaway

(57) ABSTRACT

An apparatus including an antenna for wireless communications is disclosed. The apparatus comprises an antenna including first and second radiating elements, a circuit adapted to process a signal received from or to be provided to the antenna, and a housing enclosing at least a portion of the circuit, wherein at least a portion of the housing comprises the second radiating element. The second radiating element may forms a base of the housing. Additionally, the second radiating element may be electrically coupled to ground potential. Further, the first radiating element may be situated entirely within the housing, partially within the housing, or entirely external to the housing.

34 Claims, 6 Drawing Sheets

(56) References Cited

U.S. PATENT DOCUMENTS

| | | | |
|---|---|---|---|
| 5,952,956 | A | 9/1999 | Fullerton |
| 5,960,031 | A | 9/1999 | Fullerton et al. |
| 5,963,581 | A | 10/1999 | Fullerton et al. |
| 5,969,663 | A | 10/1999 | Fullerton et al. |
| 5,977,916 | A | 11/1999 | Vannatta et al. |
| 5,995,534 | A | 11/1999 | Fullerton et al. |
| 6,031,862 | A | 2/2000 | Fullerton et al. |
| 6,044,153 | A * | 3/2000 | Kaschke .................. 379/433.01 |
| 6,091,374 | A | 7/2000 | Barnes |
| 6,111,536 | A | 8/2000 | Richards et al. |
| 6,133,876 | A | 10/2000 | Fullerton et al. |
| 6,177,903 | B1 | 1/2001 | Fullerton et al. |
| 6,218,979 | B1 | 4/2001 | Barnes et al. |
| 6,292,573 | B1 * | 9/2001 | Zurek et al. ................... 381/386 |
| 6,295,019 | B1 | 9/2001 | Richards et al. |
| 6,297,773 | B1 | 10/2001 | Fullerton et al. |
| 6,300,903 | B1 | 10/2001 | Richards et al. |
| 6,304,623 | B1 | 10/2001 | Richards et al. |
| 6,351,652 | B1 | 2/2002 | Finn et al. |
| 6,354,946 | B1 | 3/2002 | Finn |
| 6,400,307 | B2 | 6/2002 | Fullerton et al. |
| 6,400,329 | B1 | 6/2002 | Barnes |
| 6,421,389 | B1 | 7/2002 | Jett et al. |
| 6,430,208 | B1 | 8/2002 | Fullerton et al. |
| 6,437,756 | B1 | 8/2002 | Schantz |
| 6,462,701 | B1 | 10/2002 | Finn |
| 6,466,125 | B1 | 10/2002 | Richards et al. |
| 6,469,628 | B1 | 10/2002 | Richards et al. |
| 6,483,461 | B1 | 11/2002 | Matheney et al. |
| 6,489,893 | B1 | 12/2002 | Richards et al. |
| 6,492,904 | B2 | 12/2002 | Richards |
| 6,492,906 | B1 | 12/2002 | Richards et al. |
| 6,501,393 | B1 | 12/2002 | Richards et al. |
| 6,504,483 | B1 | 1/2003 | Richards et al. |
| 6,512,455 | B2 | 1/2003 | Finn et al. |
| 6,512,488 | B2 | 1/2003 | Schantz |
| 6,519,464 | B1 | 2/2003 | Santhoff et al. |
| 6,529,568 | B1 | 3/2003 | Richards et al. |
| 6,535,461 | B1 * | 3/2003 | Karhu ............................ 368/10 |
| 6,538,615 | B1 | 3/2003 | Schantz |
| 6,539,213 | B1 | 3/2003 | Richards et al. |
| 6,549,567 | B1 | 4/2003 | Fullerton |
| 6,552,677 | B2 | 4/2003 | Barnes et al. |
| 6,556,621 | B1 | 4/2003 | Richards et al. |
| 6,560,463 | B1 | 5/2003 | Santhoff |
| 6,571,089 | B1 | 5/2003 | Richards et al. |
| 6,573,857 | B2 | 6/2003 | Fullerton et al. |
| 6,577,691 | B2 | 6/2003 | Richards et al. |
| 6,585,597 | B2 | 7/2003 | Finn |
| 6,593,886 | B2 | 7/2003 | Schantz |
| 6,606,051 | B1 | 8/2003 | Fullerton et al. |
| 6,611,234 | B2 | 8/2003 | Fullerton et al. |
| 6,614,384 | B2 | 9/2003 | Hall et al. |
| 6,621,462 | B2 | 9/2003 | Barnes |
| 6,636,566 | B1 | 10/2003 | Roberts et al. |
| 6,636,567 | B1 | 10/2003 | Roberts et al. |
| 6,636,573 | B2 | 10/2003 | Richards et al. |
| 6,642,903 | B2 | 11/2003 | Schantz |
| 6,661,342 | B2 | 12/2003 | Hall et al. |
| 6,667,724 | B2 | 12/2003 | Barnes et al. |
| 6,670,909 | B2 | 12/2003 | Kim |
| 6,671,310 | B1 | 12/2003 | Richards et al. |
| 6,671,494 | B1 * | 12/2003 | James .......................... 455/66.1 |
| 6,674,396 | B2 | 1/2004 | Richards et al. |
| 6,677,796 | B2 | 1/2004 | Brethour et al. |
| 6,700,538 | B1 | 3/2004 | Richards |
| 6,710,736 | B2 | 3/2004 | Fullerton et al. |
| 6,717,992 | B2 | 4/2004 | Cowie et al. |
| 6,748,040 | B1 | 6/2004 | Johnson et al. |
| 6,750,757 | B1 | 6/2004 | Gabig, Jr. et al. |
| 6,759,948 | B2 | 7/2004 | Grisham et al. |
| 6,760,387 | B2 | 7/2004 | Langford et al. |
| 6,762,712 | B2 | 7/2004 | Kim |
| 6,763,057 | B1 | 7/2004 | Fullerton et al. |
| 6,763,282 | B2 | 7/2004 | Glenn et al. |
| 6,774,846 | B2 | 8/2004 | Fullerton et al. |
| 6,774,859 | B2 | 8/2004 | Schantz et al. |
| 6,775,206 | B2 * | 8/2004 | Karhu ............................ 368/10 |
| 6,778,603 | B1 | 8/2004 | Fullerton et al. |
| 6,781,530 | B2 | 8/2004 | Moore |
| 6,782,048 | B2 | 8/2004 | Santhoff |
| 6,788,730 | B1 | 9/2004 | Richards et al. |
| 6,791,498 | B2 * | 9/2004 | Boyle et al. ................... 343/702 |
| 6,822,604 | B2 | 11/2004 | Hall et al. |
| 6,823,022 | B1 | 11/2004 | Fullerton et al. |
| 6,836,223 | B2 | 12/2004 | Moore |
| 6,836,226 | B2 | 12/2004 | Moore |
| 6,845,253 | B1 | 1/2005 | Schantz |
| 6,847,675 | B2 | 1/2005 | Fullerton et al. |
| 6,879,878 | B2 | 4/2005 | Glenn et al. |
| 6,882,301 | B2 | 4/2005 | Fullerton |
| 6,895,034 | B2 | 5/2005 | Nunally et al. |
| 6,900,732 | B2 | 5/2005 | Richards |
| 6,906,625 | B1 | 6/2005 | Taylor et al. |
| 6,907,244 | B2 | 6/2005 | Santhoff et al. |
| 6,912,240 | B2 | 6/2005 | Kumar et al. |
| 6,914,949 | B2 | 7/2005 | Richards et al. |
| 6,917,284 | B2 | 7/2005 | Grisham et al. |
| 6,919,838 | B2 | 7/2005 | Santhoff |
| 6,922,166 | B2 | 7/2005 | Richards et al. |
| 6,922,177 | B2 | 7/2005 | Barnes et al. |
| 6,925,109 | B2 | 8/2005 | Richards et al. |
| 6,933,882 | B2 | 8/2005 | Fullerton |
| 6,937,639 | B2 | 8/2005 | Pendergrass et al. |
| 6,937,663 | B2 | 8/2005 | Jett et al. |
| 6,937,667 | B1 | 8/2005 | Fullerton et al. |
| 6,937,674 | B2 | 8/2005 | Santhoff et al. |
| 6,947,492 | B2 | 9/2005 | Santhoff et al. |
| 6,950,485 | B2 | 9/2005 | Richards et al. |
| 6,954,480 | B2 | 10/2005 | Richards et al. |
| 6,959,031 | B2 | 10/2005 | Haynes et al. |
| 6,959,032 | B1 | 10/2005 | Richards et al. |
| 6,963,310 | B2 * | 11/2005 | Horita et al. .................. 343/702 |
| 6,963,727 | B2 | 11/2005 | Shreve |
| 6,980,613 | B2 | 12/2005 | Krivokapic |
| 6,989,751 | B2 | 1/2006 | Richards |
| 6,999,584 | B1 * | 2/2006 | Bogard .................... 379/428.01 |
| 7,015,793 | B2 | 3/2006 | Gabig, Jr. et al. |
| 7,020,224 | B2 | 3/2006 | Krivokapic |
| 7,027,425 | B1 | 4/2006 | Fullerton et al. |
| 7,027,483 | B2 | 4/2006 | Santhoff et al. |
| 7,027,493 | B2 | 4/2006 | Richards |
| 7,030,806 | B2 | 4/2006 | Fullerton |
| 7,042,400 | B2 * | 5/2006 | Okubo et al. .......... 343/700 MS |
| 7,042,417 | B2 | 5/2006 | Santhoff et al. |
| 7,046,187 | B2 | 5/2006 | Fullerton et al. |
| 7,046,618 | B2 | 5/2006 | Santhoff et al. |
| 7,069,111 | B2 | 6/2006 | Glenn et al. |
| 7,075,476 | B2 | 7/2006 | Kim |
| 7,079,827 | B2 | 7/2006 | Richards et al. |
| 7,099,367 | B2 | 8/2006 | Richards et al. |
| 7,099,368 | B2 | 8/2006 | Santhoff et al. |
| 7,129,886 | B2 | 10/2006 | Hall et al. |
| 7,132,975 | B2 | 11/2006 | Fullerton et al. |
| 7,145,954 | B1 | 12/2006 | Pendergrass et al. |
| 7,148,791 | B2 | 12/2006 | Grisham et al. |
| 7,151,490 | B2 | 12/2006 | Richards |
| 7,167,525 | B2 | 1/2007 | Santhoff et al. |
| 7,170,408 | B2 | 1/2007 | Taylor et al. |
| 7,184,938 | B1 | 2/2007 | Lansford et al. |
| 7,190,722 | B2 | 3/2007 | Lakkis et al. |
| 7,190,729 | B2 | 3/2007 | Siwiak |
| 7,206,334 | B2 | 4/2007 | Siwiak |
| 7,209,724 | B2 | 4/2007 | Richards et al. |
| 7,230,980 | B2 | 6/2007 | Langford et al. |
| 7,239,277 | B2 | 7/2007 | Fullerton et al. |
| RE39,759 | E | 8/2007 | Fullerton |
| 7,256,727 | B2 | 8/2007 | Fullerton et al. |
| 7,271,774 | B2 * | 9/2007 | Puuri ........................... 343/718 |
| 7,271,779 | B2 | 9/2007 | Hertel |
| 7,280,802 | B2 * | 10/2007 | Grady ............................ 455/42 |
| 7,362,275 | B2 * | 4/2008 | Tu et al. ........................ 343/702 |
| 7,432,870 | B2 * | 10/2008 | Teshima et al. ............... 343/767 |
| 7,577,457 | B2 * | 8/2009 | Karr et al. .................. 455/550.1 |

| | | | | |
|---|---|---|---|---|
| 7,595,759 | B2 * | 9/2009 | Schlub et al. | 343/702 |
| 7,612,725 | B2 * | 11/2009 | Hill et al. | 343/702 |
| 7,639,187 | B2 * | 12/2009 | Caballero et al. | 343/702 |
| 7,688,267 | B2 * | 3/2010 | Hill | 343/702 |
| 7,746,885 | B2 * | 6/2010 | Thompson et al. | 370/436 |
| 7,764,236 | B2 * | 7/2010 | Hill et al. | 343/702 |
| 7,768,462 | B2 * | 8/2010 | Zhang et al. | 343/702 |
| 7,801,570 | B2 * | 9/2010 | Cheung et al. | 455/569.1 |
| 7,818,078 | B2 * | 10/2010 | Iriarte | 700/94 |
| 2006/0238425 | A1 * | 10/2006 | Oodachi | 343/702 |
| 2007/0241971 | A1 * | 10/2007 | Tsujimura et al. | 343/702 |

FOREIGN PATENT DOCUMENTS

| | | | |
|---|---|---|---|
| GB | 2317994 | | 4/1998 |
| JP | 8032331 | A | 2/1996 |
| JP | 10070483 | A | 3/1998 |
| JP | 2000059241 | A | 2/2000 |
| JP | 2004328686 | A | 11/2004 |
| JP | 2007027906 | A | 2/2007 |
| JP | 2007235608 | A | 9/2007 |
| TW | 200616276 | | 5/2006 |
| WO | 02063712 | | 8/2002 |
| WO | WO02063712 | | 8/2002 |

OTHER PUBLICATIONS

International Search Report—PCT/US07/080829, International Search Authority—European Patent Office, Sep. 16, 2008.

Written Opinion—PCT/US07/080829, International Search Authority—European Patent Office, Sep. 16, 2008.

International Preliminary Report on Patentability—PCT/US2007/080829, International Search Authority—European Patent Office—Mar. 30, 2010.

Taiwan Search Report—TW097139012—TIPO—Dec. 12, 2012.

* cited by examiner

APPARATUS INCLUDING HOUSING INCORPORATING A RADIATING ELEMENT OF AN ANTENNA

The present Application for Patent is a national stage submission under 35 U.S.C. §371 of Patent Application No. PCT/US2007/080829 entitled "ANTENNA INCLUDING HOUSING INCORPORATING A RADIATING ELEMENT OF AN ANTENNA" filed Oct. 9, 2007, pending, and assigned to the assignee hereof and hereby expressly incorporated by reference herein.

BACKGROUND

1. Field

The present disclosure relates generally to communications systems, and more specifically, to an antenna comprising first and second radiating elements having substantially the same characteristic features.

2. Background

Communications devices that operate on a limited power supply, such as a battery, typically use techniques to provide the intended functionality while consuming relatively small amounts of power. One technique that has been gaining in popularity relates to transmitting signals using pulse modulation techniques. This technique generally involves transmitting information using low duty cycle pulses and operating in a low power mode during times when not transmitting the pulses. Thus, in these devices, the efficiency is typically better than communications devices that operate a transmitter continuously.

Since, in some applications, the pulses may have a relatively small duty cycle, the antenna used for transmitting or receiving the pulses should minimize the effects it has on the shape or frequency content of the pulses. Thus, the antenna should have a relatively large bandwidth. Further, since the antenna may be used in low power applications where a limited power supply, such as a battery, is used, the antenna should have relatively high efficiency in transmitting or receiving signals to and from a wireless medium. Thus, its return loss across the intended bandwidth should be relatively high. Additionally, since the antenna may be used in applications where it needs to be incorporated in a relatively small housing, the antenna should also have a relatively compact configuration.

SUMMARY

An aspect of the disclosure relates to an apparatus for wireless communications. The apparatus comprises an antenna including first and second radiating elements, a circuit adapted to process a signal received from or to be provided to the antenna, and a housing enclosing at least a portion of the circuit, wherein at least a portion of the housing comprises the second radiating element. In another aspect, the second radiating element forms a base of the housing. In yet another aspect, the second radiating element is electrically coupled to ground potential.

In another aspect, the first radiating element is situated entirely within the housing. In yet another aspect, the first radiating element is situated partially within the housing. In still another aspect, the first radiating element is situated entirely external to the housing.

In another aspect, the first radiating element comprises a metallization trace disposed on a dielectric substrate. The length of the metallization trace may be approximately a quarter wavelength at a center frequency of a defined bandwidth. In yet another aspect, the first radiating element comprises a monopole. The monopole may be configured as a substantially planar metallization layer.

In another aspect, the apparatus is configured as a watch. In yet another aspect, the apparatus may further comprise a wrist band connected to the watch, wherein the first radiating element is at least partially disposed on a non-electrically conductive portion of the wrist band.

In another aspect, the first and second radiating elements of the apparatus are adapted to transmit or receive a signal within a defined ultra-wide band (UWB) channel that has a fractional bandwidth on the order of 20% or more, has a bandwidth on the order of 500 MHz or more, or has a fractional bandwidth on the order of 20% or more and has a bandwidth on the order of 500 MHz or more.

Other aspects, advantages and novel features of the present disclosure will become apparent from the following detailed description of the disclosure when considered in conjunction with the accompanying drawings.

DETAILED DESCRIPTION

Various aspects of the disclosure are described below. It should be apparent that the teachings herein may be embodied in a wide variety of forms and that any specific structure, function, or both being disclosed herein are merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

As an example of some of the above concepts, in some aspects, the apparatus including an antenna for wireless communications is disclosed. The apparatus comprises an antenna including first and second radiating elements, a circuit adapted to process a signal received from or provided to the antenna, and a housing enclosing at least a portion of the circuit, wherein at least a portion of the housing comprises the second radiating element. The second radiating element may forms a base of the housing. Additionally, the second radiating element may be electrically coupled to ground potential. Further, the first radiating element may be situated entirely within the housing, partially within the housing, or entirely external to the housing.

Figure 1A:
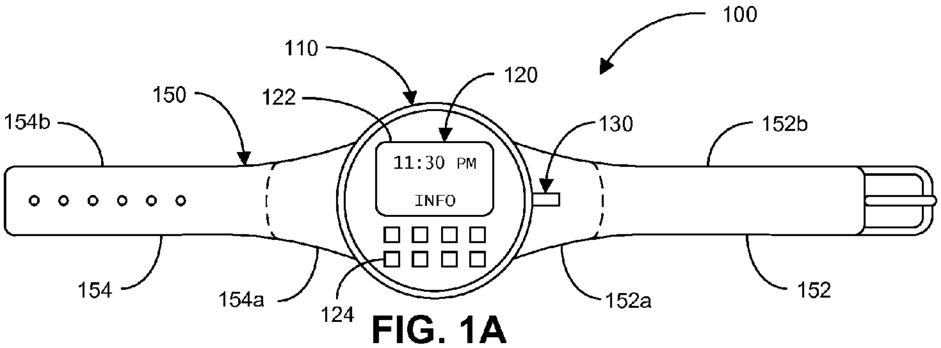
FIGS. 1A-D illustrate front, side, enlarged side, and enlarged front internal views of an exemplary watch in accordance with an aspect of the disclosure.
Figure 1B:
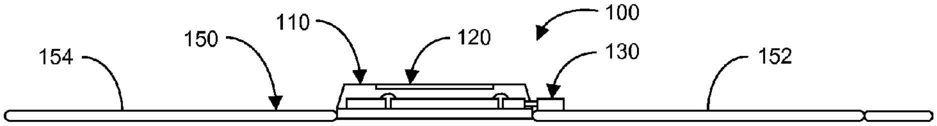

FIGS. 1A-B illustrate front and side views of an exemplary watch 100 in accordance with an aspect of the disclosure. As is discussed in more detail below, the watch includes a housing, wherein at least a portion of the housing is configured as a radiating element of an antenna. In particular, the watch 100 comprises a housing 110, a user interface 120 including a display 122 and control buttons 124, a first radiating element 130 of an antenna, and a wrist band 150. The wrist band 150, in turn, comprises a buckle portion 152 and an indexed-hole portion 154.

The wrist band portions 152 and 154 may be configured as a non-electrical conductor, such as leather. Alternatively, each wrist band portion 152 or 154 may include a non-electrical conductive portion (152*a* or 152*b*), and an electrical-conductive portion (154*a* or 154*b*), such as stainless steel. The reason being is that the first radiating element 130 of the antenna should be disposed on the non-electrical conductive portion of the wrist band 150.

Figure 1C:
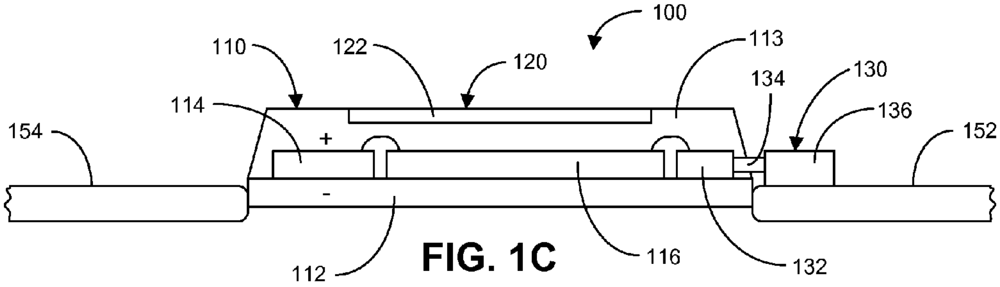
Figure 1D:
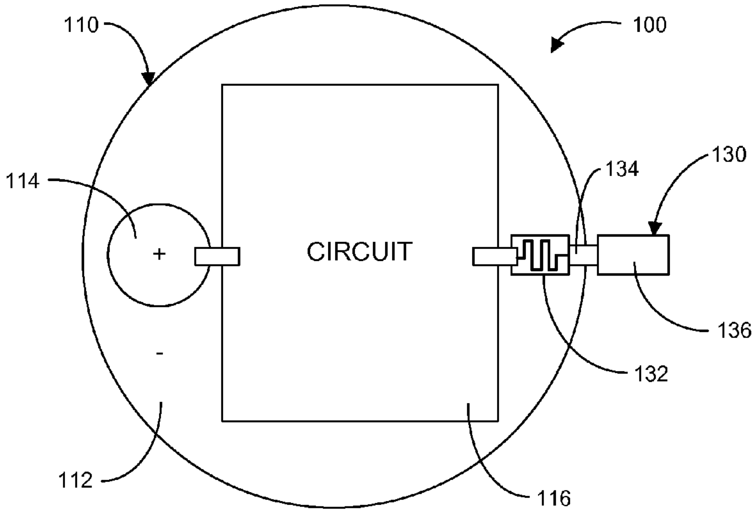
Figure 2A:
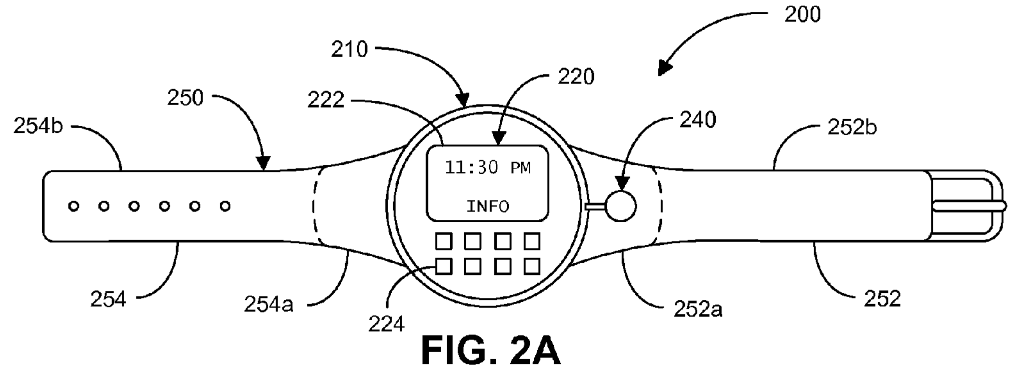
FIGS. 2A-D illustrate front, side, enlarged side, and enlarged front internal views of an exemplary watch in accordance with an aspect of the disclosure.
Figure 2B:
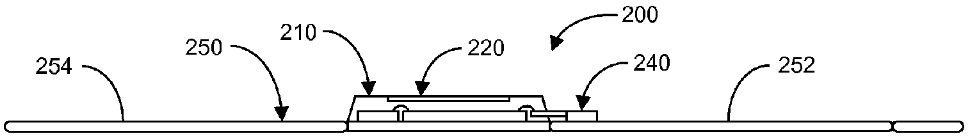
Figure 2C:
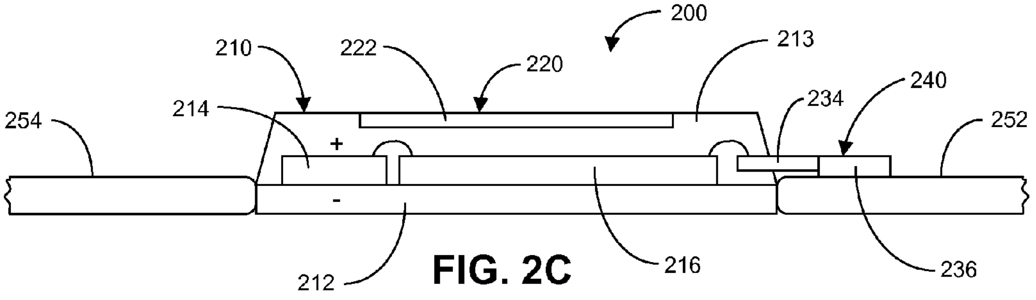
Figure 2D:
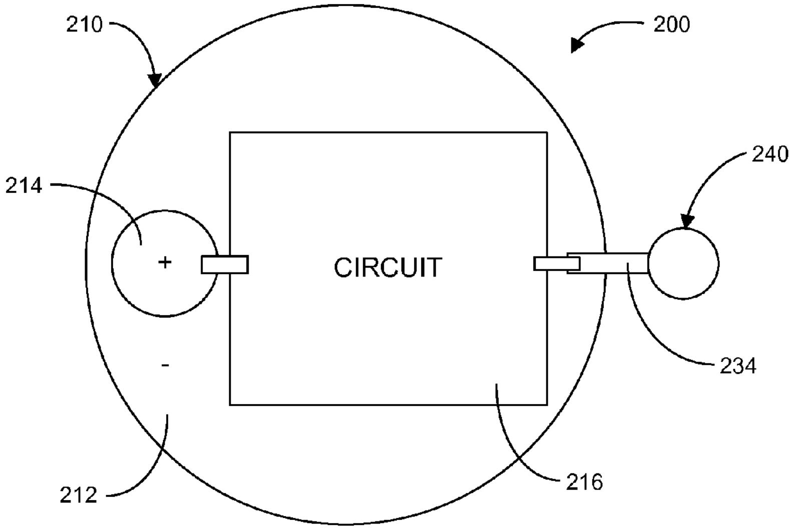

Referring to FIGS. 1C-D, which illustrate enlarged side and front internal views of the exemplary watch 100, the housing 110 is formed of a base 112 and a cover 113 to form an enclosure. The housing 110 may enclose a battery 114, a circuit 116, the user interface 120 including the display 122, and a portion of the first radiating element 130. The first radiating element 130, in turn, comprises a chip antenna 132 situated within the housing 110, an external radiating source 136 situated external to the housing, and a connection 134 to electrically connect the chip antenna 132 to the radiating source 136. The chip antenna 132 may be configured as a metallization trace disposed on a dielectric substrate, wherein the length of the metallization trace is approximately a quarter wavelength at the center frequency of a defined bandwidth. The radiating source 136 may be disposed on the non-conductive portion of the wrist band 150.

The negative terminal of the battery 114 is electrically coupled to the base 112 of the housing 110. The base 112 could be made out of an electrical conductor, such as stainless steel. In this configuration, the base 112 is electromagnetically coupled to the first radiating element 130, and thus, serves as a second radiating element of the antenna. The positive terminal of the battery 114 may be electrically coupled to the circuit 116 and the user interface 120 for supplying electrical power thereto. The circuit 116 may be electrically coupled to the first radiating element 130 for processing signals picked up by the first radiating element 130 from a wireless medium. The circuit 116 may also process signals for transmission into the wireless medium by the first radiating element 130. The circuit 116 may also process signals picked up by the first radiating element 130 and also signals for transmission into the wireless medium by the first radiating element 130. Thus, the watch 100 incorporates an antenna in a compact manner utilizing a portion of the housing to serve as a radiating element of the antenna. The antenna may be used by the watch 100 to communicate with other communications devices.

In some sample aspects, the diameter of the base or the second radiating element 112 may be configured to be approximately 29 mm to 42 mm. The height of the housing 110 may be configured to be approximately 9 mm to 13 mm. The dielectric 132 of the chip antenna 130 includes a length of approximately 5 mm to 7 mm, a width of approximately 1.5 mm to 3 mm, and a height of approximately 40 to 60 mills (thousandth of an inch). The diameter of the external radiating source 136 may be configured to be approximately 2 mm to 3.1 mm. With these parameters, this antenna may operate suitably within the UWB being defined in this disclosure such as between 6 GHz-10 GHz and preferably between 7 GHz-9 GHz.

FIGS. 2A-D illustrate front, side, enlarged side, and enlarged front internal views of an exemplary watch 200 in accordance with an aspect of the disclosure. The watch 200 is similar to watch 100, and includes many of the same elements which are designated with the same reference numbers but with the most significant digit being a “2” instead of a “1.” The difference is that the watch 200 incorporates a different structure for the first radiating element.

In particular, the first radiating element 240 of the watch 200 is configured as a planar monopole. The planar monopole 240 may be situated external to the housing 210 of the watch 200, and may be disposed on the non-electrical conductive portion of the wrist band 250. A connection 234 is provided to electrically couple the planar monopole 240 to the circuit 216 for signal processing purposes. As previously discussed, a portion of the housing 110, in this example the base 212, is electromagnetically coupled to the first radiating element 240, and serves as the second radiating element of the antenna. As mentioned above, the watch 200 incorporates an antenna in a compact manner utilizing a portion of the housing to serve as a radiating element of the antenna.

Figure 3:
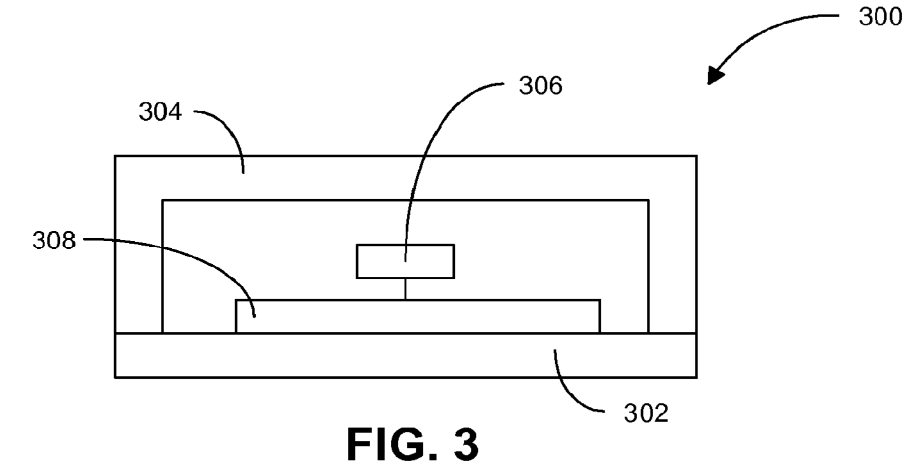
FIG. 3 illustrates a side view of an exemplary apparatus in accordance with another aspect of the disclosure.

FIG. 3 illustrates a side view of an exemplary apparatus 300 in accordance with another aspect of the disclosure. In this example, the apparatus 300 serves as a generic apparatus that incorporates the antenna concepts previously described. In particular, the apparatus 300 comprises a first means 306 for radiating an electromagnetic signal, such as a monopole or chip antenna. The apparatus 300 further comprises a second means 302 for radiating the electromagnetic signal, such as a metallic plate or base. Additionally, the apparatus 300 comprises a means 308 for processing the electromagnetic signal received from and/or to be provided to the antenna, such as a transmitter or receiver. The apparatus 300 further comprises a means (302 and 304) for enclosing at least a portion of the processing means 308. The enclosing means may comprise a cover 304 and at least a portion of the second radiating means 302, which serves as the base for the enclosure in the example.

Figure 4:
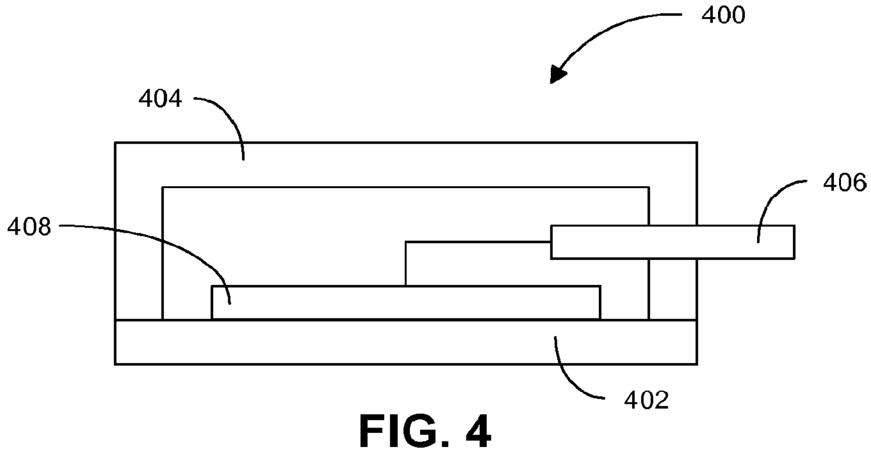
FIG. 4 illustrates a side view of another exemplary apparatus in accordance with another aspect of the disclosure.

FIG. 4 illustrates a side view of another exemplary apparatus in accordance with another aspect of the disclosure. In this example, the apparatus 400 serves as a generic apparatus that incorporates the antenna concepts previously described. In particular, the apparatus 400 comprises a housing including a base 402 and a cover 404 to form an enclosure. In this case, the housing partially encloses a first radiating element 406 of an antenna. The other portion of the first radiating element 406 may be situated external to the housing. At least a portion of the housing, such as at least a portion of the base 402 or at least a portion of the cover 404, may serve as the second radiating element of the antenna. The housing further encloses a circuit 408 which is adapted to process a signal received from and/or to be provided to the first radiating element 406.

Figure 5:
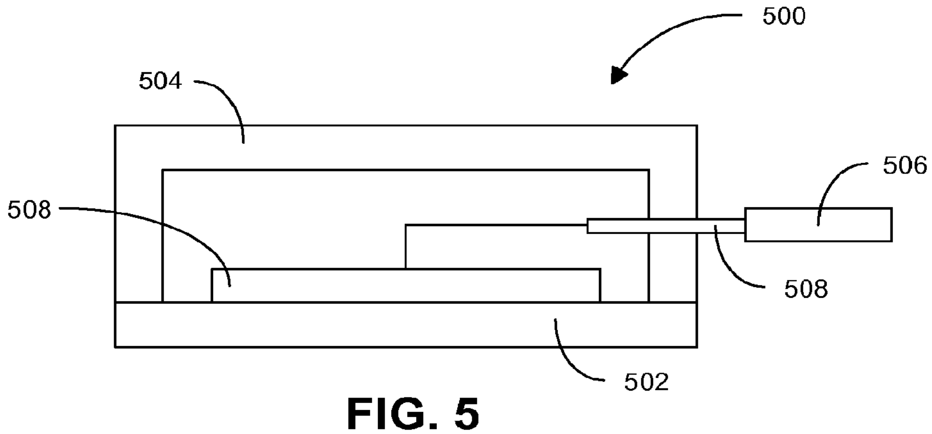
FIG. 5 illustrates a side view of another exemplary apparatus in accordance with another aspect of the disclosure.

FIG. 5 illustrates a side view of another exemplary apparatus in accordance with another aspect of the disclosure. In this example, the apparatus 500 serves as a generic apparatus that incorporates the antenna concepts previously described. In particular, the apparatus 500 comprises a housing including a base 502 and a cover 504 to form an enclosure. In this case, the first radiating element 506 is situated entirely external to the housing. The apparatus 500 may include a feed 508 to routes signals between components (not shown) situated within the housing and the first radiating element 506. At least a portion of the housing, such as at least a portion of the base 502 or at least a portion of the cover 504, may serve as the second radiating element of the antenna. The housing further encloses a circuit 508 which is adapted to process a signal received from and/or to be provided to the first radiating element 506 via the feed 508.

Figure 6:
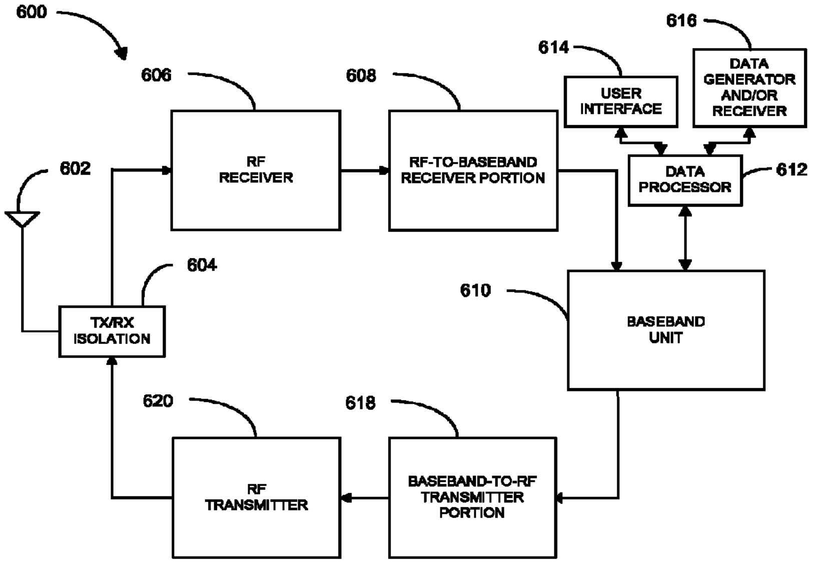
FIG. 6 illustrates a block diagram of an exemplary communications device in accordance with another aspect of the disclosure.

FIG. 6 illustrates a block diagram of an exemplary communications device 600 in accordance with another aspect of the disclosure. The communications device 600 may be particularly suited for sending and receiving data to and from other communications devices. The communications device 600 comprises an antenna 602, a Tx/Rx isolation device 604, a radio frequency (RF) receiver 606, an RF-to-baseband receiver portion 608, a baseband unit 610, a data processor 612, a user interface 614, a data generator and/or receiver 616, a baseband-to-RF transmitter portion 618, and an RF transmitter 620. The communications device 600 may be configured such that it includes a housing for enclosing at least a portion of the electronic, wherein at least a portion of the housing serves as a radiating element of the antenna 602.

In operation, the data processor 612 may receive data from another communications device via the antenna 602 which picks up the RF signal from the communications device, the Tx/Rx isolation device 604 which routes the signal to the RF receiver 606, the RF receiver 606 which amplifies the received signal, the RF-to-baseband receiver portion 608 which converts the RF signal into a baseband signal, and the baseband unit 610 which processes the baseband signal to determine the received data. The data processor 612 may then perform one or more defined operations based on the received data, such as sending the data to the user interface 614 or the data receiver 616.

Further, in operation, the data processor 612, user interface 614, and data generator and/or receiver 616 may generate outgoing data for transmission to another communications device via the baseband unit 610 which processes the outgoing data into a baseband signal for transmission, the baseband-to-RF transmitter portion 618 which converts the baseband signal into an RF signal, the RF transmitter 620 which conditions the RF signal for transmission via the wireless medium, the Tx/Rx isolation device 604 which routes the RF signal to the antenna 602 while isolating the input of the RF receiver 606, and the antenna 602 which radiates the RF signal into the wireless medium. The data generator 614 may be a sensor or other type of data generator. The user interface 614 may comprise a keyboard, a pointing device such as a mouse or a track ball, control buttons, etc.

Figure 7:
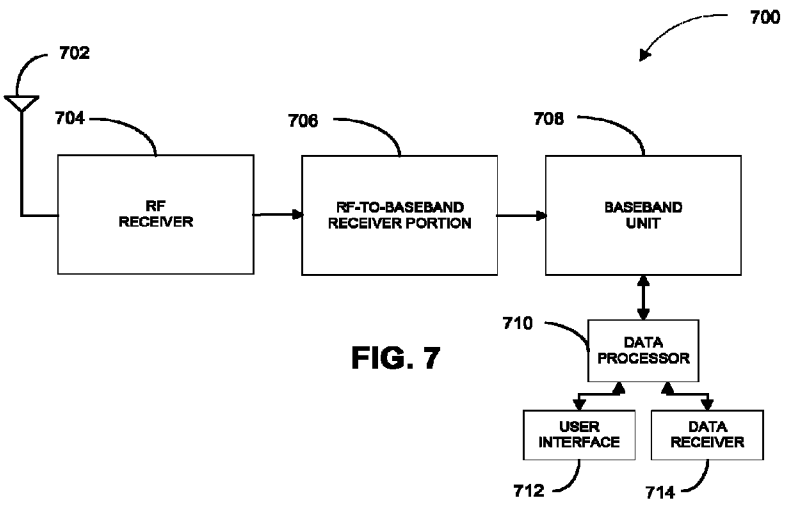
FIG. 7 illustrates a block diagram of another exemplary communications device in accordance with another aspect of the disclosure.

FIG. 7 illustrates a block diagram of an exemplary communications device 700 in accordance with another aspect of the disclosure. The communications device 700 may be particularly suited for receiving data from other communications devices. The communications device 700 comprises an antenna 702, an RF receiver 704, an RF-to-baseband receiver portion 706, a baseband unit 708, and a data processor 710. The communications device 700 may be configured such that it includes a housing for enclosing at least a portion of the electronic, wherein at least a portion of the housing serves as a radiating element of the antenna 702.

In operation, the data processor 710 may receive data from another communications device via the antenna 702 which picks up the RF signal from the communications device, the RF receiver 704 which amplifies the received signal, the RF-to-baseband receiver portion 706 which converts the RF signal into a baseband signal, and the baseband unit 708 which processes the baseband signal to determine the received data. The data processor 710 may then perform one or more defined operations based on the received data, and/or send the received or processed data to the user interface 712 and/or the data receiver 714.

Figure 8:
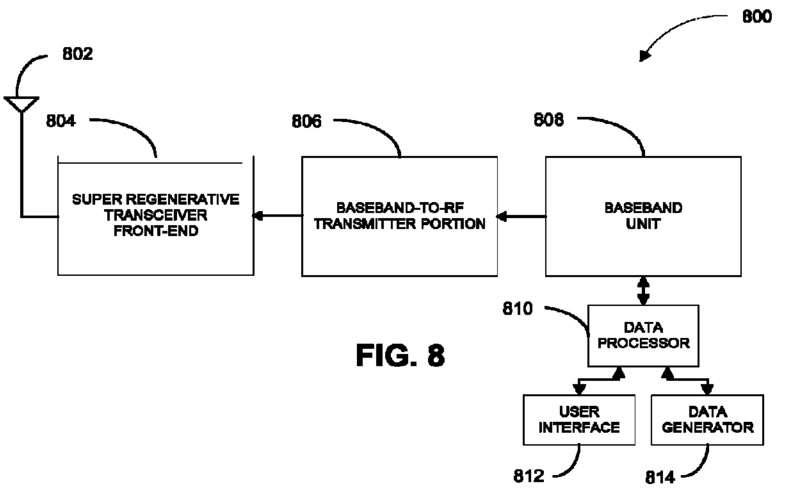
FIG. 8 illustrates a block diagram of another exemplary communications device in accordance with another aspect of the disclosure.

FIG. 8 illustrates a block diagram of an exemplary communications device 800 in accordance with another aspect of the disclosure. The communications device 800 may be particularly suited for sending data to other communications devices. The communications device 800 comprises an antenna 802, an RF transmitter 804, a baseband-to-RF transmitter portion 806, a baseband unit 808, and a data generator 810. The communications device 800 may be configured such that it includes a housing for enclosing at least a portion of the electronic, wherein at least a portion of the housing serves as a radiating element of the antenna 802.

In operation, the data processor 810, user interface 812, and/or data generator 814 may generate outgoing data for transmission to another communications device via the baseband unit 808 which processes the outgoing data into a baseband signal for transmission, the baseband-to-RF transmitter portion 806 which converts the baseband signal into an RF signal, the transmitter 804 which conditions the RF signal for transmission via the wireless medium, and the antenna 802 which radiates the RF signal into the wireless medium.

In any of the communications devices 600, 700, and 800, the corresponding data processor may include a microprocessor, a microcontroller, a reduced instruction set computer (RISC) processor, etc. The corresponding user interface may provide visual, audio or thermal indication. For example, the corresponding user interface may comprise a display, one or more light emitting diodes (LEDs), an audio device, a headset including a transducer such as speakers, etc. The corresponding data generator may be a sensor or other device that generates data. The corresponding data receiver may comprise any device for receiving and processing data. Any of the communications devices may be used in any application, such as in a medical device, a shoe, a global positioning system (GPS), a robotic or mechanical device responsive to the data, etc.

Figure 9A:
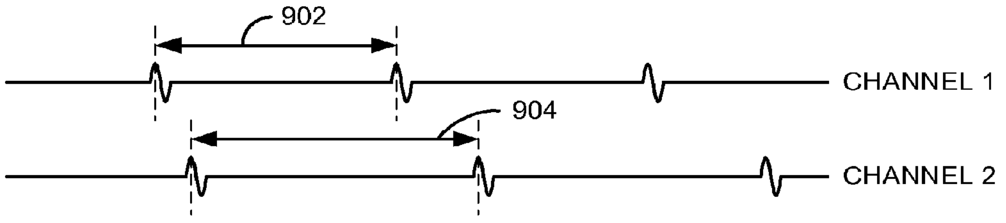
FIGS. 9A-D illustrate timing diagrams of various pulse modulation techniques in accordance with another aspect of the disclosure.

FIG. 9A illustrates different channels (channels 1 and 2) defined with different pulse repetition frequencies (PRF) as an example of a PDMA modulation. Specifically, pulses for channel 1 have a pulse repetition frequency (PRF) corresponding to a pulse-to-pulse delay period 902. Conversely, pulses for channel 2 have a pulse repetition frequency (PRF) corresponding to a pulse-to-pulse delay period 904. This technique may thus be used to define pseudo-orthogonal channels with a relatively low likelihood of pulse collisions between the two channels. In particular, a low likelihood of pulse collisions may be achieved through the use of a low duty cycle for the pulses. For example, through appropriate selection of the pulse repetition frequencies (PRF), substantially all pulses for a given channel may be transmitted at different times than pulses for any other channel.

The pulse repetition frequency (PRF) defined for a given channel may depend on the data rate or rates supported by that channel. For example, a channel supporting very low data rates (e.g., on the order of a few kilobits per second or Kbps) may employ a corresponding low pulse repetition frequency (PRF). Conversely, a channel supporting relatively high data rates (e.g., on the order of a several megabits per second or Mbps) may employ a correspondingly higher pulse repetition frequency (PRF).

Figure 9B:
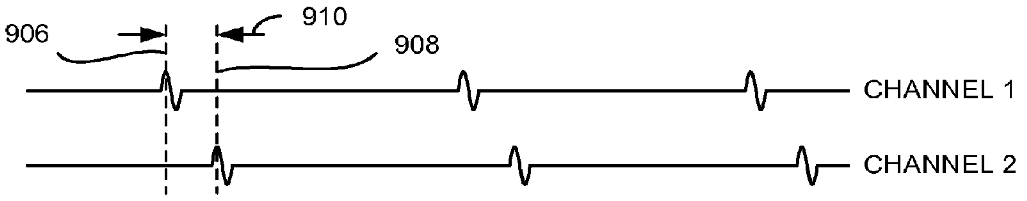

FIG. 9B illustrates different channels (channels 1 and 2) defined with different pulse positions or offsets as an example of a PDMA modulation. Pulses for channel 1 are generated at a point in time as represented by line 906 in accordance with a first pulse offset (e.g., with respect to a given point in time, not shown). Conversely, pulses for channel 2 are generated at a point in time as represented by line 908 in accordance with a second pulse offset. Given the pulse offset difference between the pulses (as represented by the arrows 910), this technique may be used to reduce the likelihood of pulse collisions between the two channels. Depending on any other signaling parameters that are defined for the channels (e.g., as discussed herein) and the precision of the timing between the devices (e.g., relative clock drift), the use of different pulse offsets may be used to provide orthogonal or pseudo-orthogonal channels.

Figure 9C:
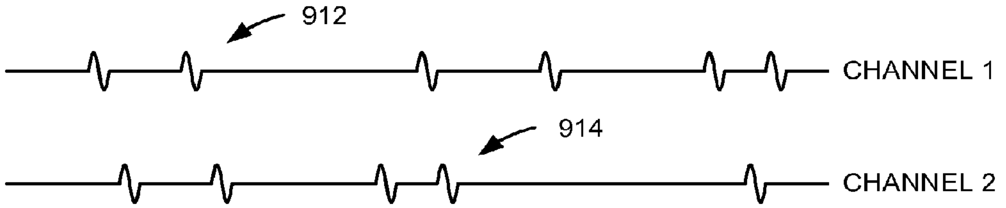

FIG. 9C illustrates different channels (channels 1 and 2) defined with different timing hopping sequences. For example, pulses 912 for channel 1 may be generated at times in accordance with one time hopping sequence while pulses 914 for channel 2 may be generated at times in accordance with another time hopping sequence. Depending on the specific sequences used and the precision of the timing between the devices, this technique may be used to provide orthogonal or pseudo-orthogonal channels. For example, the time hopped pulse positions may not be periodic to reduce the possibility of repeat pulse collisions from neighboring channels.

Figure 9D:
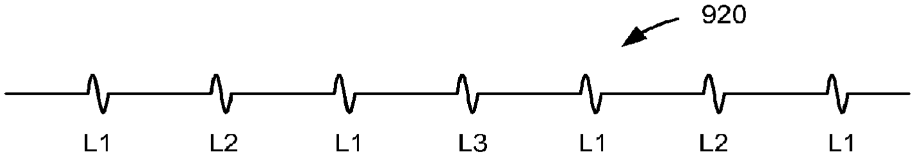

FIG. 9D illustrates different channels defined with different time slots as an example of a PDM modulation. Pulses for channel L1 are generated at particular time instances. Similarly, pulses for channel L2 are generated at other time instances. In the same manner, pulse for channel L3 are generated at still other time instances. Generally, the time instances pertaining to the different channels do not coincide or may be orthogonal to reduce or eliminate interference between the various channels.

It should be appreciated that other techniques may be used to define channels in accordance with a pulse modulation schemes. For example, a channel may be defined based on different spreading pseudo-random number sequences, or some other suitable parameter or parameters. Moreover, a channel may be defined based on a combination of two or more parameters.

Figure 10:
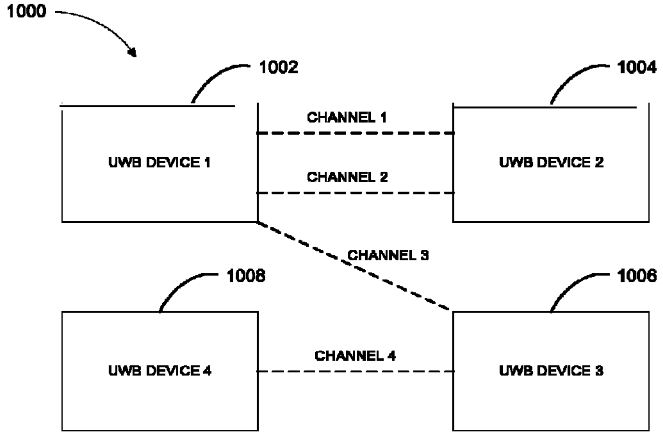
FIG. 10 illustrates a block diagram of various communications devices communicating with each other via various channels in accordance with another aspect of the disclosure.

FIG. 10 illustrates a block diagram of various ultra-wide band (UWB) communications devices communicating with each other via various channels in accordance with another aspect of the disclosure. For example, UWB device 1 1002 is communicating with UWB device 2 1004 via two concurrent UWB channels 1 and 2. UWB device 1002 is communicating with UWB device 3 1006 via a single channel 3. And, UWB device 3 1006 is, in turn, communicating with UWB device 4 1008 via a single channel 4. Other configurations are possible. The communications devices may be used for many different applications, and may be implemented, for example, in a headset, microphone, biometric sensor, heart rate monitor, pedometer, EKG device, watch, shoe, remote control, switch, tire pressure monitor, or other communications devices.

Any of the above aspects of the disclosure may be implemented in many different devices. For example, in addition to medical applications as discussed above, the aspects of the disclosure may be applied to health and fitness applications. Additionally, the aspects of the disclosure may be implemented in shoes for different types of applications. There are other multitude of applications that may incorporate any aspect of the disclosure as described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. An apparatus for wireless communications, comprising:
- an antenna comprising first and second radiating elements;
- a circuit adapted to process a signal received from or to be provided to the antenna; and
- a housing enclosing at least a portion of the circuit, wherein the housing comprises a first member including at least an exterior portion comprising the second radiating element, and a second member coupled to the first member in a manner so as to enclose at least a portion of the first radiating element within an interior of the housing.

2. The apparatus of claim 1, wherein the second radiating element is electrically coupled to a ground potential.

3. The apparatus of claim 1, wherein the first radiating element comprises a metallization trace disposed on a dielectric substrate.

4. The apparatus of claim 3, wherein a length of the metallization trace is approximately a quarter wavelength at a center frequency of a defined bandwidth.

5. The apparatus of claim 1, wherein the first radiating element comprises a monopole.

6. The apparatus of claim 5, wherein the monopole comprises a substantially planar metallization layer.

7. The apparatus of claim 1, wherein the circuit is adapted to transmit or receive the signal within a defined ultra-wide band channel that has a fractional bandwidth on the order of 20% or more, has a bandwidth on the order of 500 MHz or more, or has a fractional bandwidth on the order of 20% or more and has a bandwidth on the order of 500 MHz or more.

8. The apparatus of claim 1, wherein the first member of the housing comprises a base plate of the housing.

9. The apparatus of claim 8, wherein the circuit is disposed on the base plate.

10. The apparatus of claim 9, wherein the second member of the housing comprises a cover coupled to the base plate.

11. The apparatus of claim 1, wherein the first member of the housing comprises a wall of the housing.

12. The apparatus of claim 1, wherein the first member of the housing comprises a cover of the housing.

13. The apparatus of claim 1, wherein another portion of the first radiating element is situated external to the housing.

14. The apparatus of claim 13, wherein the housing encloses the entire first radiating element.

15. The apparatus of claim 1, wherein the first radiating element comprises:
- a first radiating member situated entirely within the interior of the housing;
- a second radiating member situated entirely external to the housing; and
- a connection adapted to electrically couple the first radiating member to the second radiating member.

16. The apparatus of claim 15, wherein the first radiating member comprises a chip antenna and the second radiating member comprises a radiating source.

17. The apparatus of claim 1, wherein the second member of the housing includes an opening through which the first radiating element extends from the interior of the housing to an exterior of the housing.

18. The apparatus of claim 1, wherein the first radiating element comprises a portion situated outside of the housing and disposed on a non-electrically conductive structure mechanically coupled to the housing.

19. A method for wireless communications, comprising:
- electromagnetically coupling a first radiating element to a second radiating element;
- electrically coupling a circuit to the first radiating element;
- situating at least a portion of the circuit within a housing;
- configuring a first member of the housing to include at least an exterior portion comprising the second radiating element; and
- coupling a second member of the housing to the first member in a manner so as to enclose at least a portion of the first radiating element within an interior of the housing.

20. The method of claim 19, further comprising electrically coupling the second radiating element to a ground potential.

21. The method of claim 19, further comprising configuring the first radiating element as a metallization trace disposed on a dielectric substrate.

22. The method of claim 21, further comprising configuring a length of the metallization trace to be approximately a quarter wavelength at a center frequency of a defined bandwidth.

23. The method of claim 19, further comprising configuring the first radiating element as a monopole.

24. The method of claim 23, further comprising configuring the monopole as a substantially planar metallization layer.

25. An apparatus for wireless communications, comprising:

a first means for radiating an electromagnetic signal;

a second means for radiating the electromagnetic signal;

a means for processing the electromagnetic signal received from or to be provided to the first radiating means; and a means for enclosing at least a portion of the processing means, wherein the enclosing means comprises a first member including at least an exterior portion comprising the second radiating means, and a second member coupled to the first member in a manner so as to enclose at least a portion of the first radiating means within an interior of the enclosing means.

26. The apparatus of claim 25, wherein the second radiating means is electrically coupled to a ground potential.

27. The apparatus of claim 25, wherein the first radiating means comprises a metallization trace disposed on a dielectric substrate.

28. The apparatus of claim 27, wherein a length of the metallization trace is approximately a quarter wavelength at a center frequency of a defined bandwidth.

29. The apparatus of claim 25, wherein the first radiating means comprises a monopole.

30. The apparatus of claim 29, wherein the monopole comprises a substantially planar metallization layer.

31. A headset, comprising:

an antenna comprising first and second radiating elements;

a receiver adapted to receive an incoming signal including audio data from a remote apparatus via the antenna;

a transducer adapted to generate an audio output from the audio data; and a housing enclosing at least a portion of the receiver, wherein the housing comprises a first member including at least an exterior portion comprising the second radiating element, and a second member coupled to the first member in a manner so as to enclose at least a portion of the first radiating element within an interior of the housing.

32. A watch, comprising:

an antenna comprising first and second radiating elements;

a receiver adapted to receive an incoming signal including data from a remote apparatus via the antenna;

a user interface adapted to produce an indication based on the received data; and a housing enclosing at least a portion of the receiver, wherein the housing comprises a first member including at least an exterior portion comprising the second radiating element, and a second member coupled to the first member in a manner so as to enclose at least a portion of the first radiating element within an interior of the housing.

33. The watch of claim 32, further comprising a wrist band connected to the housing, wherein the first radiating element is at least partially disposed on a non-electrically conductive portion of the wrist band.

34. A position location device, comprising:

an antenna comprising first and second radiating elements;

a receiver adapted to receive signals from a satellite via the antenna; and a housing enclosing at least a portion of the receiver, wherein of the housing comprises a first member including at least an exterior portion comprising the second radiating element, and a second member coupled to the first member in a manner so as to enclose at least a portion of the first radiating element within an interior of the housing.

* * * * *